Patented Sept. 5, 1939

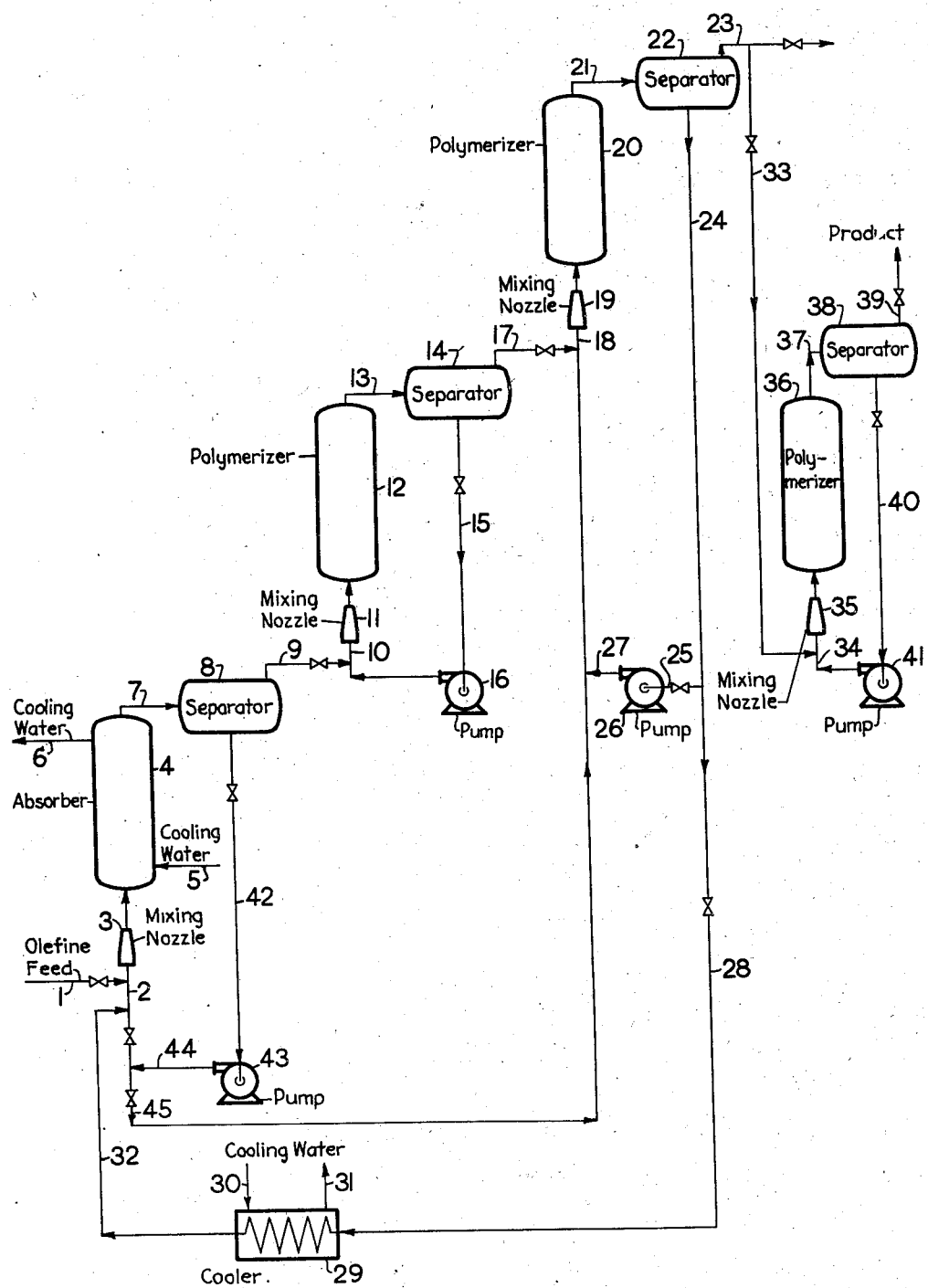

2,171,928

UNITED STATES PATENT OFFICE 2,171,928

OLEFIN INTERPOLYMERIZATION PROCESS

William P. Gage, Deer Park, Tex., assignor to Shell Development Company, San Francisco, Calif., a corporation of Delaware Application December 20, 1938, Serial No. 246,843

6 Claims. (Cl. 260—683)

This invention relates to reactions between different olefins, referred to as interpolymerization in contradistinction to the combination of like olefin molecules which is termed copolymerization. The invention deals particularly with the reaction of tertiary olefins with secondary olefins to form higher boiling iso-olefins.

Tertiary olefins are those olefins which contain an unsaturated tertiary carbon atom, e. g. the grouping

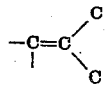

initially or those, like isopropyl ethylene, which isomerize to such a form under the interpolymerization conditions used. Secondary olefins are normal or iso-olefins, other than ethylene, containing the group —CH=CH—. Prior methods for carrying out interpolymerization between such olefins have been subject to material losses thru copolymerization of the olefins used, particularly of the more reactive olefin.

I have found that such undesirable side reactions may be materially reduced and higher yields of interpolymerization products obtained by proper control of the relative proportions of the different olefins being reacted. The process of my invention provides a method whereby the proper olefin proportions, particularly a substantial excess of the less reactive olefin, may be maintained thruout the reaction. My novel interpolymerization procedure has the further advantages of providing more complete olefin reaction and of increasing plant capacity.

In its preferred form my interpolymerization process comprises first selectively absorbing a part of the more reactive olefin to be reacted in a suitable olefin polymerization catalyst solution, then contacting the remainder of said olefin together with an excess of the less reactive olefin which it is desired to interpolymerize therewith, with an olefin polymerization catalyst under conditions at which interpolymerization takes place and reacting the olefin remaining thereafter with the absorption product of the step first described. In some cases it may be desirable to add still another interpolymerization stage in which the remaining more reactive olefin, if any, may be reacted.

For the purpose of making my invention clear it will be described with more particular reference to the manufacture of octylenes from butane-butylene fractions obtainable from the products of petroleum cracking, using aqueous sulphuric acid as the polymerizing agent. It will be understood, however, that this is merely for purposes of illustration and implies no limitation on my invention as the same, or equivalent, procedures may be used for the polymerization of other mixtures containing tertiary and secondary olefins regardless of the source or other constituents of the mixture. Thus, tertiary olefins which may be present in the mixtures which may be used in the process of my invention include, in addition to isobutylene, trimethylethylene, unsymmetrical methyl ethyl ethylene, tetramethylethylene and the like while typical secondary olefins which may be present therewith are, for example, propylene, alpha and beta butylene, alpha and beta amylene, 2-methyl pentene-4, etc. The olefins may be used in a pure state as mixtures of one or more tertiary olefins with one or more secondary olefins or such mixtures containing other components such, for example, as paraffins and/or diolefins, etc., may be used. Particularly suitable are hydrocarbon fractions consisting of, or predominating in, hydrocarbons containing the same number of carbon atoms to the molecule altho nonisomeric mixtures containing tertiary and secondary olefins may also be used. Furthermore instead of sulphuric acid, other suitable strong mineral acids, such as phosphoric, benzene sulphonic, and like acids, for example, or their mixtures may be employed as polymerizing agent.

While my invention is capable of embodiment in different forms and may be carried out in different kinds of apparatus, the accompanying drawing, which is a diagrammatic representation of one assembly of apparatus which I have found to be particularly useful, illustrates an especially advantageous method of carrying out my process. In the drawing 1 represents a supply line thru which an olefinic mixture from a source not shown is fed to the system of my invention. The olefinic mixture, for example, a butanebutylene fraction containing isobutylene and a secondary butylene is fed by supply line 1 to pipe line 2 where it contacts a suitable olefin absorption agent, for example, an aqueous sulphuric acid solution of polymerizing strength. The resulting mixture is passed thru mixing nozzle 3 to insure intimate mixing of the two phases present and then into absorber 4 which may be of any suitable design to maintain the absorption agent and hydrocarbon thoroughly admixed for sufficient time for absorption of a substantial amount of the more reactive olefin, in the present instance the isobutylene, by the absorption agent. The absorber is preferably provided with suitable means for indirect cooling of the reaction mixture thru which cooling water or other cooling media may be circulated by inlet pipe 5 and outlet pipe 6. By thus maintaining a relatively low temperature in the absorber undesirable polymerization may be avoided and the desired amount of isobutylene, usually between 25% and about 75% of the total present, may be selectively absorbed without materially reducing the amount of secondary butylenes present. The products of the absorption step pass by line 7 to separator 8 where the hydrocarbon phase is separated from the absorption product as by stratification and decantation altho other suitable methods of separating immiscible liquid phases such as centrifugation or the like may be used. The hydrocarbon phase containing a lower ratio of isobutylene to secondary butylene than the feed is passed by line 9 to contact with a polymerizing agent in line 10. The mixture of hydrocarbon and polymerizing agent passes thru mixing nozzle 11 to polymerizer 12 in which the exothermic heat of reaction is usually sufficient to maintain the temperature necessary for reaction of the isobutylene with a part of the secondary butylene present to form octylenes. In some cases it may be desirable to provide temperature regulating means such as heating or cooling coils, not shown, to assist in maintaining the desired interpolymerization temperature. The products of the interpolymerization reaction are withdrawn thru line 13 and separated into a hydrocarbon phase containing the interpolymerization products and polymerization agent phase in separator 14. The latter is returned by line 15 and pump 16 to line 10 for further contact with previously extracted hydrocarbon. The hydrocarbon phase is conducted by line 17 to pipe 18 in which it contacts the absorption product from absorber 4. The absorption product is supplied to line 18 by pump 43 thru line 45 after having been withdrawn from separator 8 by lines 42 and 44. The absorption product and hydrocarbon are thoroughly admixed in mixing nozzle 19 and then fed to polymerizer 20 which may advantageously although not necessarily be of the same design as polymerizer 12. The time of contact in polymerizer 20 is so regulated and the temperature is so controlled as to effect substantial interpolymerization of the absorbed olefin with secondary olefin in the hydrocarbon. The reacted mixture is taken off through line 21 to separator 22. In most cases this treatment will have resulted in substantially complete polymerization of the more reacive olefin in the feed so the hydrocarbon phase from separator 22 may be withdrawn through valve controlled line 23 for recovery of the interpolymerization product by distillation or other treatment not shown. The reacted phase, in any case, is withdrawn through line 24. A part of the acid may advantageusly be returned to the polymerization system by valve controlled line 25, pump 26 and lines 27 and 18. The remaining acid is conducted by line 28 to cooler 29 which is provided with an inlet 30 and an outlet 31 so that cooling water may be circulated in indirect heat transfer relation with the acid to bring it to a temperature sufficiently low for use in further isobutylene absorption. The cooled acid is then returned by line 32 to contact with the olefin feed in line 2.

In case the olefin polymerization is not sufficiently complete after reaction in polymerizer 20, another reaction similar to polymerizer 12 may be used. Thus hydrocarbon from separator 22 may be conducted by line 33 to contact with hot acid or other suitable polymerization agent in line 34 and the mixture passed through mixing nozzle 35 to polymerizer 36. In this unit practically complete conversion of any remaining tertiary olefin may be effected. The reacted mixture may then be taken off through line 37 and the hydrocarbon phase present, containing the interpolymerization products produced separated in separator 38 and withdrawn thru line 39. The acid is removed from the separator by line 40 and recycled to the polymerization system by pump 41.

The conditions of operation of the different stages of my process are preferably adjusted to the nature of the different olefins being interpolymerized and the polymerization agent or agents used. For the reaction of tertiary olefins with secondary olefins such as propylene, alpha and/or beta butylenes, or the normal amylenes or the like using a strong polybasic mineral acid such as sulphuric or phosporic acids as the polymerizing agent, acid concentrations between about 55% and about 85% are preferred. In such cases the first absorption stage, which I preferably always operate under non-polymerizing conditions, may be operated at temperatures in the range of about 10° to about 55° C., while the subsequent polymerization stages are preferably operated at temperatures of the order of about 70° to about 125° C. The higher temperature operations are employed where the less concentrated acids are used and vice versa. For interpolymerization of tertiary olefins with ethylene more drastic conditions are advisable, while for interpolymerization of isobutylene with secondary butylene temperatures of about 25° to 45° C. and about 80° to about 120° C. for the absorption and polymerization steps respectively, are preferred.

The contact time to be used in each of the reaction stages will likewise depend, other things being equal, upon the olefinic mixture being treated particularly upon the nature and proportions of the olefins present and their concentration. Thus where the proportion of tertiary to secondary olefins is high, for example, longer time of contact in the absorption stage will be desirable than where lower proportions are present as I prefer to always absorb sufficient of the more reactive olefin or olefins present so that a substantial molecular excess of the less reactive olefin or olefins will be present in the first polymerizer unit. I preferably regulate the absorption so as to maintain the same ratio of secondary to tertiary olefins in each of the polymerizers 12 and 20 and preferably maintain a ratio of at least 2.5, or more preferably of at least 3 to about 10 mols of secondary olefin per mol of tertiary olefin. Under such conditions using the preferred ratios of about 0.25 to about 2.5 mols of sulphuric acid per mol of olefin, polymerization times of about 1 to 25 minutes are suitable. While I prefer to carry out all the steps of my process under sufficient pressure to maintain the olefins involved in the liquid phase this is not essential although I find such operation especially advantageous in the polymerization stages.

The following results of a large scale test of the process of my invention using two polymerization units (12 and 20 of the drawing) in comparison with the same units operated without my system of olefin ratio control shows its advantages and economies. In both cases the feed was a butane-butylene fraction containing 15% isobutylene and 31.3% normal butylenes and the polymerizing agent was 70% sulphuric acid. The polymerizers were maintained in all cases at 76° C. In the operations according to the process of my invention 35 to 40% of the isobutylene was first absorbed in the acid at a temperature of about 32° to 38° C. Under these conditions hardly any of the secondary butylenes were absorbed and substantially no polymerization took place. The residual hydrocarbon having a secondary to tertiary olefin ratio of about 3.5 to 1 was used as feed to the first polymerizer, while the absorption product was the acid feed to the second polymerizer in which as a result the secondary to tertiary olefine ratio was also about 3.5 to 1. The average results for 24 hours of operation by the new method at a feed rate of about 100 barrels per hour, in comparison with two stage polymerization without previous absorption were:

|  | Two stage polymerization without olefin absorption | Process of the invention. Two stage polymerization using the absorption product from a preliminary stage as polymerization agent in the second polymerization stage |
|---|---|---|
| Polymerization, percent by weight: | | |
| Isobutylene | 98.6 | 98.2 |
| Alpha and beta butylenes | 38.5 | 45.7 |
| Total | 58.3 | 63.1 |
| Ratio of isobutylene to total butylenes polymerized | 0.557 | 0.515 |

These results show that the process of the invention increases the amount of secondary butylenes reacted by about 19%.

In another test using a third polymerization stage corresponding to 36 in the drawing the isobutylene conversion was increased to 99.3%.

The process of my invention is capable of wide variation not only with respect to the different olefines which may be polymerized and the polymerization agents which may be used but also in regard to the method of operation employed. For example instead of using the same polymerization agent in each of the successive stages different agents and/or different concentrations of the same agent may be used, thus it may in some cases be advantageous to use weaker acid for the olefin absorption, and consequently for the second polymerization stage, then is used for the first stage of interpolymerization. Solid polymerization catalysts such as are described in U. S. Patent 2,018,065 may be used in the first stage of interpolymerization. Also, whereas the polymerization steps have been shown as carried out in single units, it will be clear that this is not necessary as polymerizers 12 and 20 may either or both be replaced by or supplemented with other similar units which may be connected in either parallel or series and may utilize countercurrent flow or not as desired. Furthermore instead of passing the hydrocarbon through the entire system before recovering the interpolymers formed, these products may be separated after any polymerization stage or stages before reacting the remaining olefine in the next succeeding stage. Another variaton within the scope of my invention comprises further augmenting the proportion of less reactive olefin present in any of polymerization stages by recycling unreacted hydrocarbon from the same or any other stage to such polymerization stage. For example a valve controlled line connecting line 10 with lines 17 and/or 23 or line 18 with lines 23 and/or 39 may be used to return a part of the unreacted hydrocarbon to the polymerizers to increase the proportion of secondary olefins therein. Such recycling has of course the disadvantage of also increasing the amount of non-reactive hydrocarbon present in the system if such material is a component of the feed and consequently reduces the capacity of the polymerizers. Instead of reacting the entire absorption product from absorber 4 with secondary olefin in polymerizer 20 a part only may be reacted while the remainder may be withdrawn from the system for other suitable use. It will thus be evident that the process of my invention may be carried out in many different ways and that it is not to be regarded as limited to the details of operation disclosed nor by the theories advanced in explanation of the improved results attained, but only by the terms of the accompanying claims in which it is my intention to claim all novelty inherent therein as broadly as possible in view of the prior art.

I claim as my invention:

1. A process of producing an interpolymerization product of isobutylene and a secondary butylene which comprises contacting a butane-butylene fraction containing said olefins with sulphuric acid of about 55% to about 85% concentration at about 25° C. to about 45° C. until a substantial part of the isobutylene content of said fraction is absorbed by said acid, separating the absorption product from the unabsorbed butane-butylene mixture, contacting the latter with sulphuric acid of about 55% to about 85% concentration at a temperature of about 80° to about 120° C. for a time between about 1 and about 25 minutes sufficient to effect substantial interpolymerization between isobutylene and secondary butylene present therein, separating hydrocarbon containing unreacted secondary butylene from said acid and reacting said hydrocarbon with at least a part of the previously separated isobutylene absorption product at a temperature of about 80° to about 120° C. until substantial interpolymerization of isobutylene with secondary butylene is effected.

2. A process of producing an interpolymerization product of isobutylene and a secondary butylene which comprises contacting a butane-butylene fraction containing said olefins with a strong polybasic mineral acid capable of absorbing and polymerizing said olefins under conditions at which between about 25% and about 75% of the isobutylene is absorbed by said acid without substantial isobutylene polymerization, separating the absorption product from the unabsorbed hydrocarbon, contacting the latter with a polybasic mineral acid capable of effecting interpolymerization of isobutylene with secondary butylene at a temperature and pressure and for a time at which substantial interpolymerization of the unabsorbed isobutylene takes place, and reacting the remaining secondary butylene containing hydrocarbon with the previously separated isobutylene absorption product at a temperature and for a time at which interpolymerization between said isobutylene and said secondary butylene is effected.

3. A process of producing an interpolymerization product of a tertiary olefin with a secondary olefin which comprises contacting hydrocarbon containing said olefins with sulphuric acid of about 55% to about 85% concentration at a temperature of about 10° to about 55° C. for a time at which absorption of a part of the tertiary olefin content of said hydrocarbon is effected without substantial polymerization of said olefin, contacting the unabsorbed hydrocarbon with sulphuric acid of about 55% to about 85% concentration at about 70° to about 125° C. for a time at which substantial interpolymerization between tertiary olefin and secondary olefin present therein takes place, and reacting the remaining secondary olefin with said tertiary olefin-sulphuric acid absorption product at a temperature of about 70° to about 125° C. until substantial interpolymerization between said olefins is effected.

4. A process of producing an interpolymerization product of a tertiary olefin with a secondary olefin which comprises selectively absorbing under non-polymerizing conditions a part of the tertiary olefin content of a hydrocarbon mixture containing said olefins in an aqueous solution of an acid capable of absorbing said tertiary olefin and of effecting said interpolymerization, reacting remaining tertiary olefin and secondary olefin in the presence of an olefin polymerization agent at a temperature and pressure and for a time at which interpolymerization of at least a part of said olefins takes place, and contacting secondary olefin remaining unreacted thereafter with said tertiary olefin absorption product at a temperature of about 70° to about 125° C. until substantial interpolymerization between said secondary olefin and said absorbed tertiary olefin takes place.

5. The process in accordance with claim 4 in which the proportion of tertiary olefin absorbed and the amount of absorption product contacted with secondary olefin are such that the ratios of secondary olefin to tertiary olefin in the two said polymerization stages are approximately the same.

6. A process of producing an interpolymerization product of a tertiary olefin with a secondary olefin which comprises contacting hydrocarbon containing said olefins with an aqueous solution of an acid capable of absorbing said tertiary olefin and of effecting said interpolymerization until a substantial part of the tertiary olefin content of said hydrocarbon is absorbed by said acid, reacting remaining tertiary olefin and secondary olefin in the presence of an olefin polymerization agent at a temperature and pressure and for a time at which interpolymerization of at least a part of said olefins takes place, and contacting secondary olefin remaining unreacted thereafter with said tertiary olefin absorption product at a temperature and for a time at which interpolymerization between said olefins is effected.

WILLIAM P. GAGE.